(12) United States Patent
Steffl et al.

(10) Patent No.: US 7,104,188 B2
(45) Date of Patent: Sep. 12, 2006

(54) FRUIT PRESS

(75) Inventors: Michael Steffl, Marquartstein (DE); Marko Areh, Radlje ob Dravi (SI); Stanislav Mazej, Gomilsko (SI); Igor Zibret, Smartno ob Paki (SI); Peter Brezovnik, Mozirje (SI); Henrik Pavlovic, Ljubno ob Savinji (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/771,659

(22) Filed: Feb. 4, 2004

(65) Prior Publication Data

US 2005/0028682 A1 Feb. 10, 2005

(51) Int. Cl.
 A23L 1/00 (2006.01)
 A23N 1/00 (2006.01)
 A47J 19/02 (2006.01)

(52) U.S. Cl. ............................................. 99/508; 99/506

(58) Field of Classification Search ................... 99/485, 99/486, 489, 492, 495, 501–508, 509–513, 99/516; 241/101.01, 37.5, 92, 101.2, DIG. 17
See application file for complete search history.

(56) References Cited

U.S. PATENT DOCUMENTS

| 793,189 | A | * | 6/1905 | Groundman | 99/508 |
| 1,411,813 | A | | 4/1922 | Stein | |
| 2,003,521 | A | * | 6/1935 | Smith | 99/484 |
| 2,057,227 | A | * | 10/1936 | Blum | 99/505 |
| 2,410,562 | A | | 11/1946 | Barany | |
| 6,539,848 | B1 | * | 4/2003 | Wang et al. | 99/508 |
| 6,668,709 | B1 | * | 12/2003 | Codina Vilana et al. | 99/503 |

FOREIGN PATENT DOCUMENTS

EP 0 362 058 A1 4/1990

* cited by examiner

Primary Examiner—Timothy F. Simone
(74) Attorney, Agent, or Firm—John T. Winburn; Russell W. Warnock; Craig J. Loest

(57) ABSTRACT

A fruit press containing a centrally arranged element projecting upward from a base to a tip. The element base has an outer annular surface for the pressing of fruit. The annular surface having ridges on the outer surface that run from the base to the tip. The outer surface having trough-like recesses between the ridges with a cross-section substantially in the form of a circle.

6 Claims, 2 Drawing Sheets

FRUIT PRESS

Figure 1:
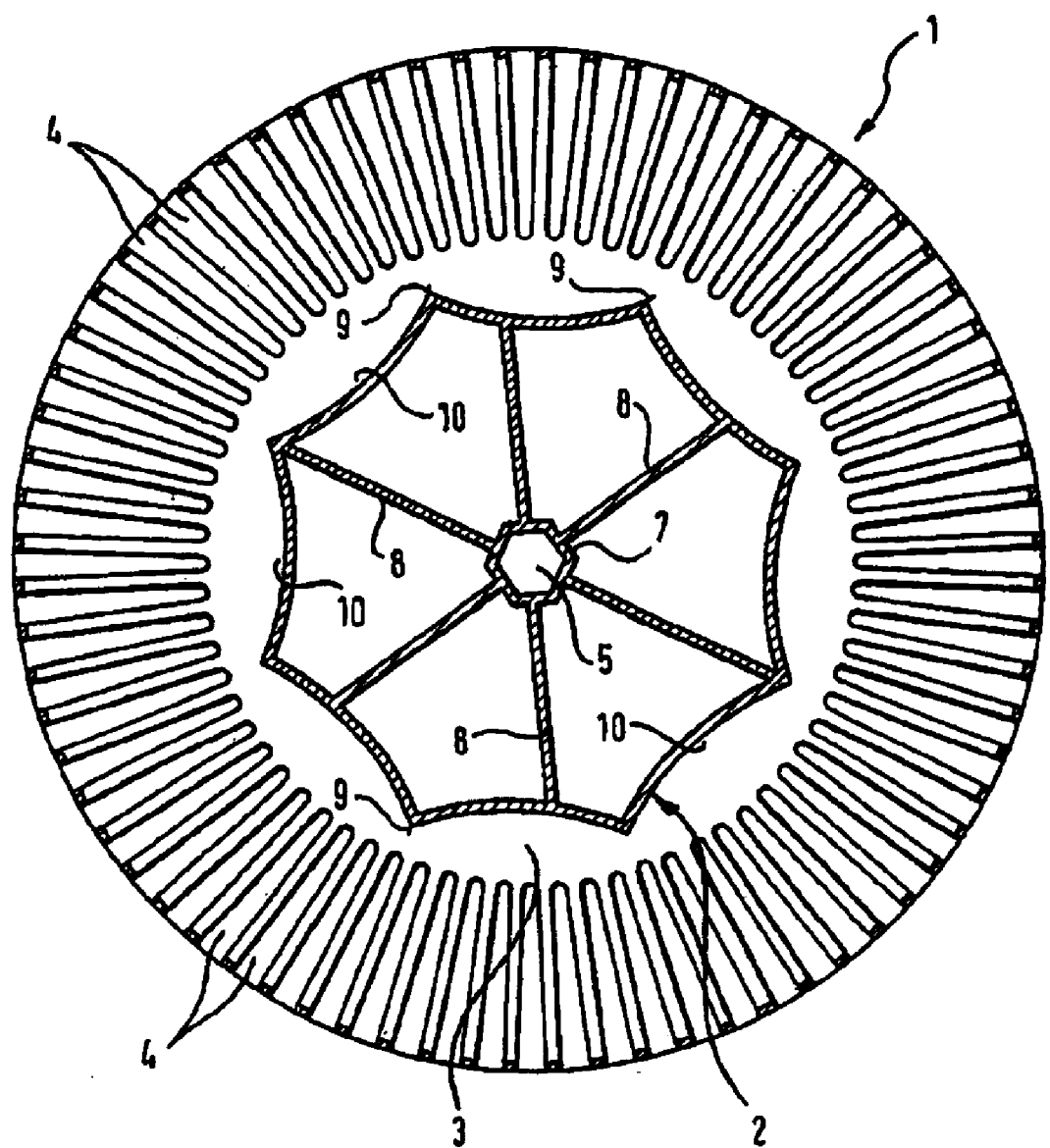

The present invention relates to a fruit press comprising a centrally arranged, projecting element which tapers to the top for the pressing of a fruit and an annular surface surrounding the base of said element, whereby the element has ridges on its outer surface, running from the base of the element upwards, between which trough-shaped recesses are arranged.

Such fruit presses are generally known. Their purpose is to squeeze lemons, oranges, grapefruit and the like. With fruit presses, independently of whether they are manual or motor-driven presses, there is the problem of squeezing out the fruit juice from the fruit as completely as possible.

EP 0 362 058 B1 discloses a fruit press driven by an electromotor. In this fruit press there are spiral-shaped ribs provided on an outer surface, which rise as narrow strips above an also rotationally symmetrical outer surface.

It is the object of the present invention to improve on the known fruit press.

According to the present invention a fruit press of the type initially specified, in that the ridges and the recesses are arranged helically, solves this task.

With ridges being provided according to the present invention, edges are made available which are sufficiently sharp to tear off the walls between the fruit-containing cells of the fruit, so that fruit juice runs out. Due to the trough-shaped recesses between the ridges there is enough space to ensure that the fruit juice can escape.

The helical arrangement of the ridges gives rise to a screw-like effect, which is why the element rotates into the fruit during the pressing procedure. This supports the pressing procedure. The user of the fruit press can press the fruit by exerting minimal pressure against the element. Due to the helical arrangement of the ridges the fruit flesh is squeezed out without tearing. This aids in boosting the juice yield during pressing of the fruit, while at the same time the work effort is reduced.

Advantageous further developments will emerge from the sub-claims.

A particularly advantageous further development is that the element is designed substantially conical and the ridges run up to a central upper tip on the element.

Because of this particular shape of the element the form of the inner walls of the fruit peel, in particular a lemon is adapted. When all the juice is squeezed out of the fruit the ridges scrape against the inner walls of the fruit, such that all the juice is pressed out of it.

By way of advantage the fruit press is configured such that the element is substantially hollow in its interior and has a hollow shaft for slipping onto a journal of a drive shaft. This shape is suitable if the fruit press is driven by motor. Due to the hollow shaft a rapid connection can be made with the drive shaft of the motor. On the other hand the element can easily be removed from the drive shaft along with then annular surface surrounding it, for cleaning.

By way of advantage walls are arranged between the hollow shaft and an outer wall having the outer surface on its outer side. This particular measure increases the stability of the fruit press. The element is not deformed, if a fruit is pressed against the element under high force to extract the juice.

For the drive shaft to be taken up distortion-free by the hollow shaft, the hollow shaft is fitted with an angular cross-section, for example a hexagonal cross-section and thus has a hexagonal wall.

It is of advantage if the walls in the element adjoin the edges of the hollow shaft at a right angle. The purpose of this measure is also to lend considerable stability to the element.

Figure 2:
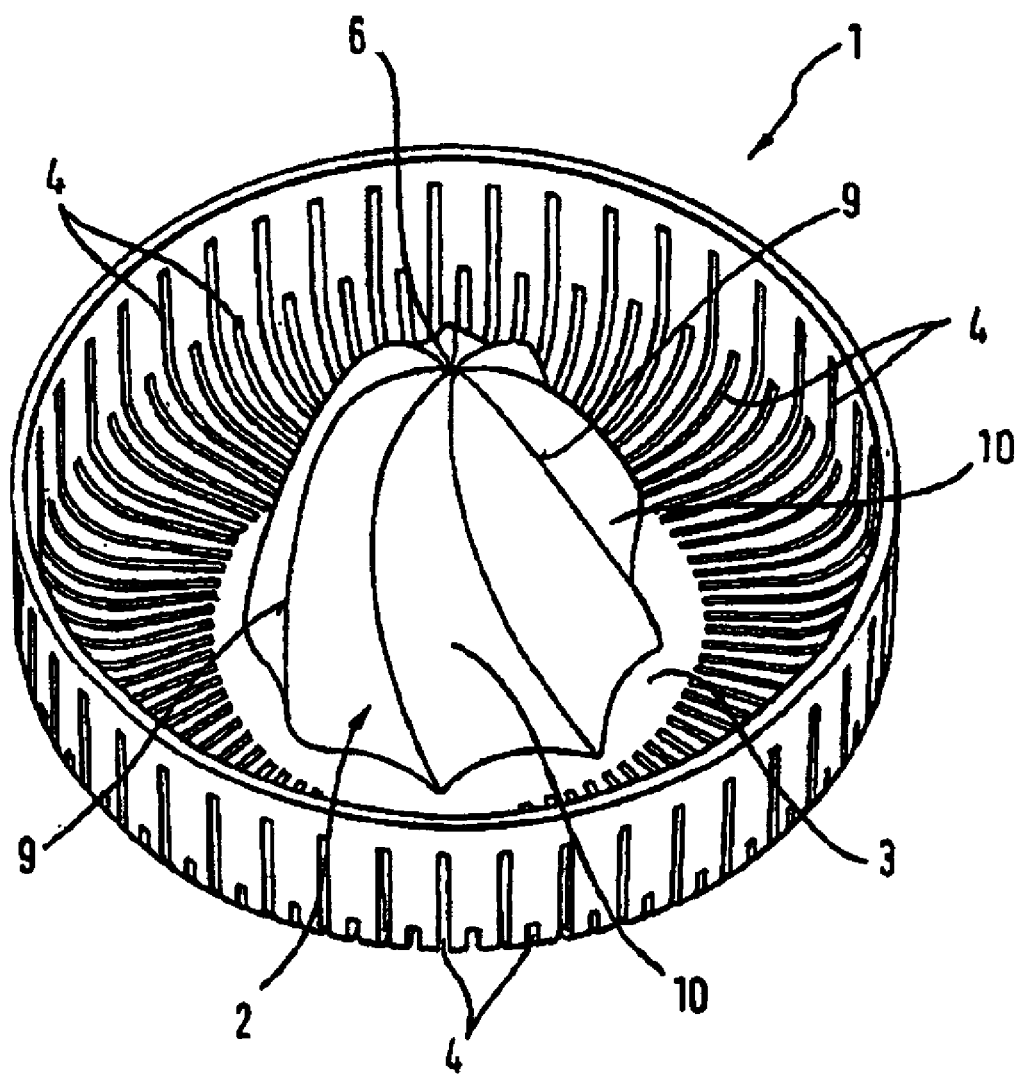

An embodiment of the invention will now be explained in greater detail with reference to the diagram, in which:

FIG. 1 shows a fruit press in cross-section in a plane in the region of its base, and FIG. 2 shows the fruit press as per FIG. 1 in a perspective view.

A fruit press 1 has a centrally arranged element 2, which substantially has the shape of a rotational parabola, a hemisphere or a cone, and which is enclosed on its base by an annular surface 3. In the annular surface 3 the fruit juice gathers, which comes from squeezing a fruit above the element 2. The fruit juice drips into a container (not shown here), where it gathers, through slots 4 arranged like ribs.

The element 2 is substantially designed as a hollow body, in which a hollow shaft 5 is arranged centrally and projects to a tip 6 of the element. The hollow shaft 5 preferably has the cross-section of an n-angle, for example a hexagon for positively taking up a journal of a drive shaft, and a corresponding edged wall 7.

Walls 8 adjoin the wall 7 at a right angle. The walls 8 act as reinforcing ribs and adjoin an outer wall 8 of the element 2. On its external wall, i.e. on its outer surface, the outer wall 8 bears helically arranged ridges 9, which in each case run from the base of the element 2, i.e. from the level of the annular surface 3, up to the tip 6. Between the ridges 9 lie troughs 10, via which the fruit juice flows to the annular surface 3.

The result of the ridges 9 being arranged in spirals on the element 2 is that the element 2 penetrates particularly easily into the fruit, in particular, if the fruit press is driven by motor in the same direction, in which the direction of rotation of the ridges also lies. The walls of the cells of the fruit, which guide the juice, are easily torn away by the ridges 9 having a sharp form, to let the fruit juice drip out.

It is understood that the form of the element 2 is also suitable for fruit presses not operated by motor and not revolving.

What is claimed is:

1. A fruit press, comprising:
   a centrally arranged element projecting upward from a base to a tip and having an outer surface for the pressing of fruit;
   an annular surface surrounding said element base;
   said element having ridges on said outer surface running from said base substantially to said tip;
   trough-like recesses formed in said outer surface between said ridges; and
   said trough-like recesses having a concave arcuate cross-section bowing inwardly between the corresponding ridges.

2. The fruit press according to claim 1, including said centrally arranged element is formed substantially conical and projects upward from said base to a centrally located tip and said ridges run up to said tip.

3. The fruit press according to claim 1, including said centrally arranged element is formed substantially hollow inside with an outer wall having said outer surface and includes a hollow central shaft extending through the substantially hollow inside of the element with an outer wall and an inner wall adapted to fit onto a drive shaft for the press.

4. The fruit press according to claim 3, including said centrally arranged element has reinforcing walls formed between said hollow central shaft outer wall and said element outer wall.

5. The fruit press according to claim 4, including said hollow central shaft is formed with an angular cross-section outer wall.

6. The fruit press according to claim 5, including said reinforcing walls join said hollow central shaft outer wall substantially perpendicular.

* * * * *